United States Patent [19]

Gilman

[11] 4,293,274
[45] Oct. 6, 1981

[54] VERTICAL AXIS WIND TURBINE FOR GENERATING USABLE ENERGY

[76] Inventor: Frederick C. Gilman, 4th and Market, Box 395, Osceola, Mo. 64776

[21] Appl. No.: 78,643

[22] Filed: Sep. 24, 1979

[51] Int. Cl.³ .............................................. F03D 7/06
[52] U.S. Cl. ...................................... 416/51; 416/88; 416/176; 416/197 A
[58] Field of Search .......... 416/87, 88, 197 A, 176 A, 416/139 A, 43 A, 44 A, 51 A, DIG. 9, 88

[56] References Cited

U.S. PATENT DOCUMENTS

| 1,697,574 | 1/1929 | Savonius | 416/197 A X |
| 2,596,726 | 5/1952 | Rydell | 416/197 A X |

FOREIGN PATENT DOCUMENTS

| 103819 | 7/1926 | Austria | 416/87 |
| 187865 | 6/1906 | Fed. Rep. of Germany | 416/197 A |
| Ad.35860 | 3/1930 | France | 416/197 A |
| 1518151 | 7/1978 | United Kingdom | 416/176 A |

Primary Examiner—Everette A. Powell, Jr.
Attorney, Agent, or Firm—Daniel H. Bobis; Norman N. Popper

[57] ABSTRACT

A wind turbine for converting wind forces into usable energy has a main shaft rotatably mounted in the axis of rotation for the wind turbine, and a pair of coacting complementary longitudinally extending vane members are connected to each other by a plurality of support and transmission assemblies in the form of articulated members and to the main or driven shaft for driving engagement thereof. The coacting vane members may either have straight side edges or preferably have spiralled or helically shaped side edges which in the closed position are aligned and in abutment with each other to define and form a right circular cylinder in side elevation. The vanes are movable between a normally open starting position and a closed position to vary the total vane surface available for contact by the wind forces acting at any given time when the wind turbine is in operation. Articulated members of the support and transmission assemblies are pivoted to permit translational or side wise movement to and fro of the complementary vanes transverse relative to each other and the vertical axis through the main shaft, and pivotal cross members on each of the articulated support and transmission assemblies are vertically linked together to simultaneously alter the articulated members during such movement. The respective complementary and cooperating vanes have their weight so distributed that centrifugal forces will act to move the complementary vanes towards the closed or right circular cylindrical form automatically as high rotational speeds result from excessive wind.

Additionally the wind turbine as above described with resilient means to move the coacting cooperating vanes to the normally open starting position.

11 Claims, 13 Drawing Figures

VERTICAL AXIS WIND TURBINE FOR GENERATING USABLE ENERGY

BACKGROUND OF THE INVENTION

This invention relates generally to devices for converting wind forces into usable energy and more particularly to a vertical axis wind turbine for this purpose.

The technology developed for converting wind forces into work energy is well known. For example, devices such as wind mills are evidence of the long standing recognition that it is possible to harness wind forces to perform tasks requiring energy output as well as to gather and store energy thus developed.

A particular construction for such purposes hereinafter referred to as a wind turbine or wind motor is disclosed in U.S. Pat. No. 1,697,574 to Savonius. The Savonius device comprises a rotor disposed on a vertical axis which has complementary vertically and longitudinally extending elements rotatable about individual axes to define in horizontal cross-section an essentially S-shaped configuration. This device known as the "S-rotor," resembles the cylindrical rotor of Professor Gustav Magnus and is distinguishable in that the oppositely arranged complementary vanes overlap to define between them centrally S-shaped air passage of constant area which Savonius found enhanced the speed and torque developed by the rotor. Among its advantages, the Savonius S-rotor was operable in response to any wind movement, regardless of direction.

In a further U.S. Pat. No. 1,766,765 Savonius provides an improved vertical axis wind turbine wherein he makes provision for speed control means comprising movable flaps located in transverse relation on the complementary vanes to reduce the speed of rotation of the rotor member during excessive wind movement and velocities.

In U.S. Pat. No. 2,596,726 to Rydell another vertical axis type wind turbine is shown having telescoping and complementary semi-cylindrical elements which are respectively curved and capable of lateral displacement with respect to each other to define the S-shaped rotor in operation. Rydell relies on a rack and pinion linkage for the lateral adjustment of his vanes.

U.S. Pat. No. 3,093,194 to Rusconi also relates to a vertically disposed wind motor having a plurality of vertically disposed curved air foils which are pivotally linked with respect to each other to define in one configuration an approximate S-shaped rotor. Rusconi controls the speed and energy developed by his device by coiled torsion springs for resisting the relative outward movement of the respective vanes during operation of the device. The spring tends to bring the blades into a configuration promoting the S-shape which optimizes operation of the device.

Finally, U.S. Pat. No. 3,942,909 to Yengst discloses a vertical axis wind driven rotor having hinged vanes which rotate on individual axes to move from the closed position in which they form a cylinder to an open position defining the S-shaped rotor similar to Savonius.

All of the above devices possess certain drawbacks, in that they tend to be erratic in operation and subject to undesirable variations in torque and energy output. Further, the devices of Savonius and Rydell are intended for reversible operation applicable primarily for the propulsion of ships, and were thus less concerned with the type of uniformity of torque and rotation which has been found desirable in the instance where the devices of this type are to be applied for the purpose of harnessing wind currents to produce energy and to perform specific work tasks.

Finally, all of the foregoing devices have relatively complex construction which is expensive to assemble and maintain.

The present invention overcomes the problem of these prior art devices by providing a wind turbine which has a substantially consistent uniform output in an environment of constantly varying wind forces and speeds, and includes means to avoid damage to the device resulting from excessive rotating during periods of extreme wind forces and velocities as occurs during wind storms and the like.

SUMMARY OF THE INVENTION

Thus the present invention covers a wind turbine for converting wind forces into usable energy which includes, a base, a generally vertically disposed shaft rotatably mounted on said base, a rotor defined by complementary coacting vanes symmetrically disposed about said main shaft, support and transmission assembly means connecting said vanes to said shaft for driving engagement therewith, said support and transmission assembly including, a plurality of articulated members connected at spaced intervals on opposite sides thereof to each of said complementary coacting vanes, and at least two pivotal members connected to said main shaft and to each of said plurality of articulated members to permit sidewise movement to and fro of each of the respective vanes transverse to the axis of rotation of said shaft to vary the surface on each respective vane available for contact by the wind forces, and means to prevent excessive rotation of the rotor when the wind turbine is in operation.

The wind turbine as above described in which the articulated members define a variable parallelogram between the points of connection to the respective complementary coacting vanes.

The wind turbine as above described in which the elongated longitudinally extending vanes are disposed to define helically extending longitudinal side edges which pass through an arc of 180° between the opposite ends of the respective complementary coacting vanes and wherein the vanes are so constructed that the sidewise relative movement thereof to and fro permits the longitudinal side edges to align and abut each other to form the rotor into a generally defined right circular cylinder in the closed position.

Accordingly, it is a principal object of the present invention to provide a wind turbine which is preferably rotated about the vertical axis thereof, and is self adjusting in operation to maintain uniformity of rotational output within a range of varying wind velocities.

It is another object of the present invention to provide a wind turbine as aforesaid wherein the speed of rotation of the turbine may be controlled to avoid damage thereto resulting from the stress of excessive wind velocities.

It is another object of the present invention to provide a wind turbine as aforesaid wherein speed of rotation, torque output and side drag forces resulting from the operation of the turbine will be reasonably controlled.

It is a further object of the present invention to provide a wind turbine which is of simple and inexpensive construction, and is durable in use.

Other objects and advantages will become apparent to those skilled in the art from a consideration of the following description which refers to the Figures of the drawings as follows:

DETAILED DESCRIPTION OF THE INVENTION

Figure 1:
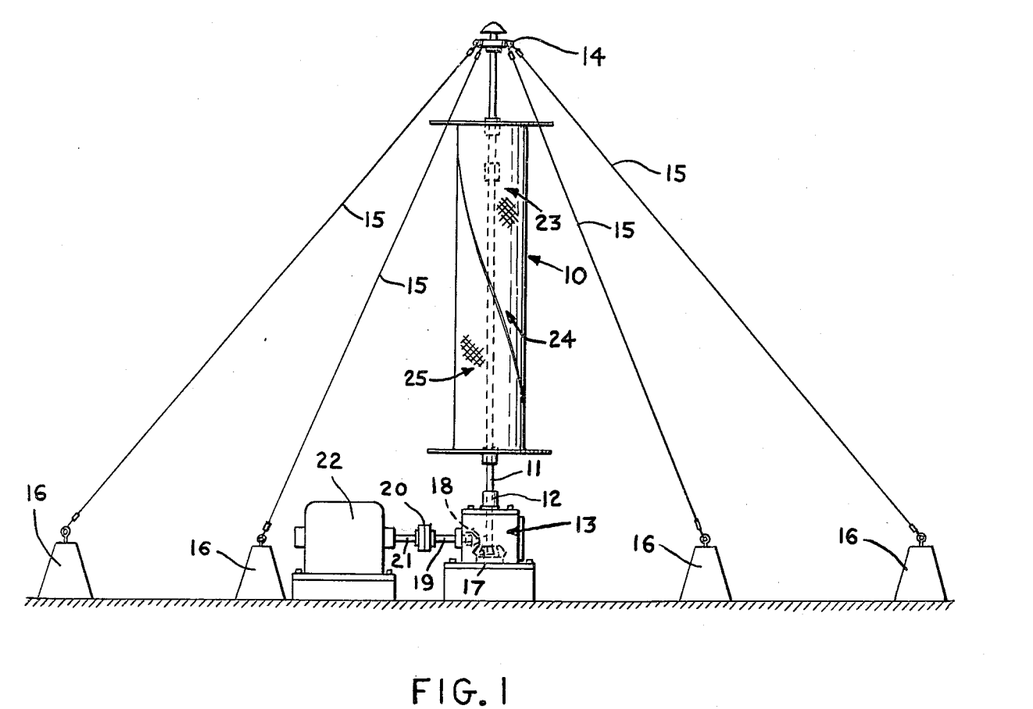
FIG. 1 illustrates a wind powered generating apparatus which includes one form of vertical axis wind turbine in accordance with the present invention.

Referring to the drawings FIG. 1 illustrates diagrammatically a wind powered generating apparatus which includes a vertical axis wind turbine generally designated 10 in accordance with the present invention.

The vertical axis wind turbine 10 includes a main shaft 11 rotatably mounted in a lower bearing member 12 mounted in a suitable base 13 and an upper bearing 13 disposed in a connecting member 14 which is retained in assembled position by a plurality of guy wires 15 connected to associated anchors as at 16. The lower end of the main or driven shaft 11 is disposed in a thrust bearing 17 and is connected by means of bevel gears 18 to a connecting or jack shaft 19 in turn coupled by coupling means 20 to the driven shaft 21 of generator means generally designated 22. When the wind turbine 10 is rotated as hereinafter more fully described to drive the main shaft 11 the rotational forces developed in the main shaft 11 are transmitted through the bevel gears 18 and shaft 19 to the driven shaft 21 so as to drive the generator 22. This assembly is so well known to those skilled in the art as not to require further description or illustration for purposes of the present invention.

While the vertical axis wind turbine in accordance with the present invention is illustrated as applied to the generation of electrical power, it will be understood by those skilled in the art that the wind turbine can be utilized with pumping equipment, compressing equipment, or other equipment which requires a prime mover.

However, the vertical axis wind turbine 10 in accordance with the present invention is particularly characterized by an improved design and structure for providing the required uniformity of rotational output within a range of variable wind velocities so as to permit the driven equipment to develop a substantially constant and uniform energy output.

FIGS. 2 to 9 show one preferred form of vertical axis wind turbine in accordance with the present invention and this form of the invention will now be described.

Thus, FIGS. 1 to 9 show that the vertical axis wind turbine in accordance with the present invention includes a rotor 23 which is symmetrically disposed about the main shaft 11.

Figure 2:
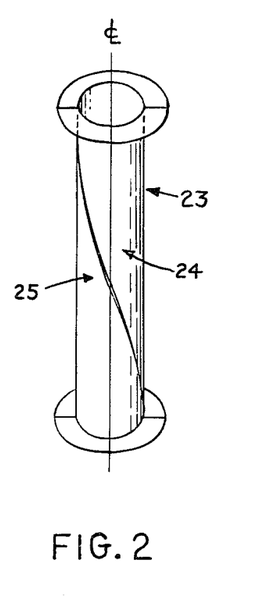
FIGS. 2, 3 and 4 are schematic perspective views of the rotor in the vertical axis wind turbine shown in FIG. 1 and the preferred configurations for the vanes thereof.
Figure 3:
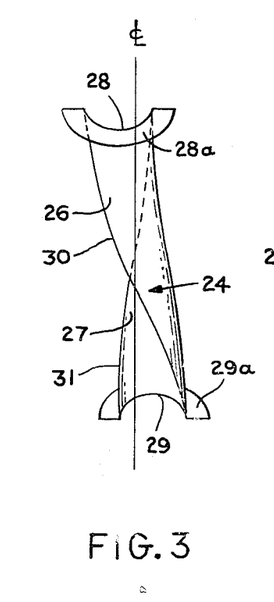
Figure 4:
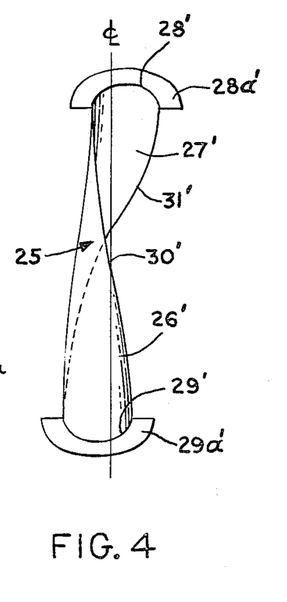
Figure 5:
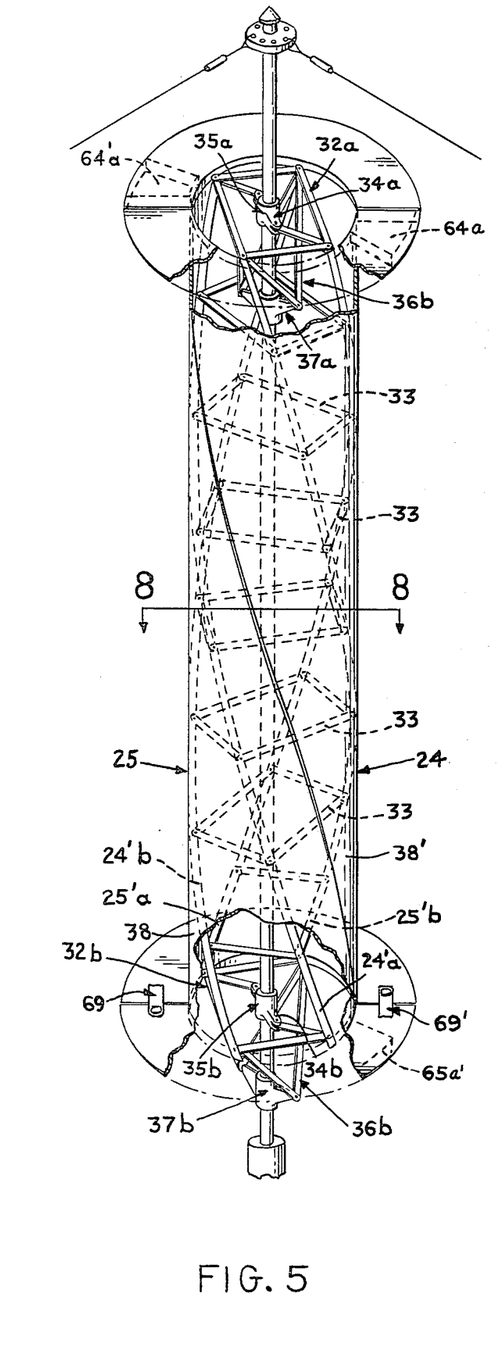
FIG. 5 is an enlarged perspective view of the rotor in the closed or non-operating position having portions thereof broken away to show the relationship between the main or driven shaft and the support and transmission assembly for the vanes of the rotor.

Rotor 23 is shown in FIGS. 1, 2 and 5 in the closed position as constituting a generally elongated right circular cylindrical member having a pair of complementary cooperating vanes generally designated 24 and 25.

Vanes 24 and 25 as shown in FIGS. 3, 4, 5, 6 are identical duplicates of each other and in the preferred form of this invention, include respectively an outer wall 26 an inner wall 27, an upper end 28, a lower end 29 and side margins as at 30 and 31 for vane 24 and the corresponding outer wall 26', inner wall 27', upper end 28', lower end 29' and side margins 30' and 31' for the vane 25.

Further since the vanes 24 and 25 define the elongated rotor 23 they also are elongated and in the preferred form of the invention are in the longitudinal axis thereof spriraled or helically shaped through an arc of 180° from the upper end to the lower end thereof.

As can be readily seen by reference to FIGS. 1, 2 and 5 of the drawings, when the vertical axis wind turbine 10 is not in operation the vanes 24 and 25 are aligned with each other so that the side margins 30 and 31, 30' and 31' are in abutment and form or define the right circular cylinder shape of the rotor when viewed in side elevation.

Figure 6:
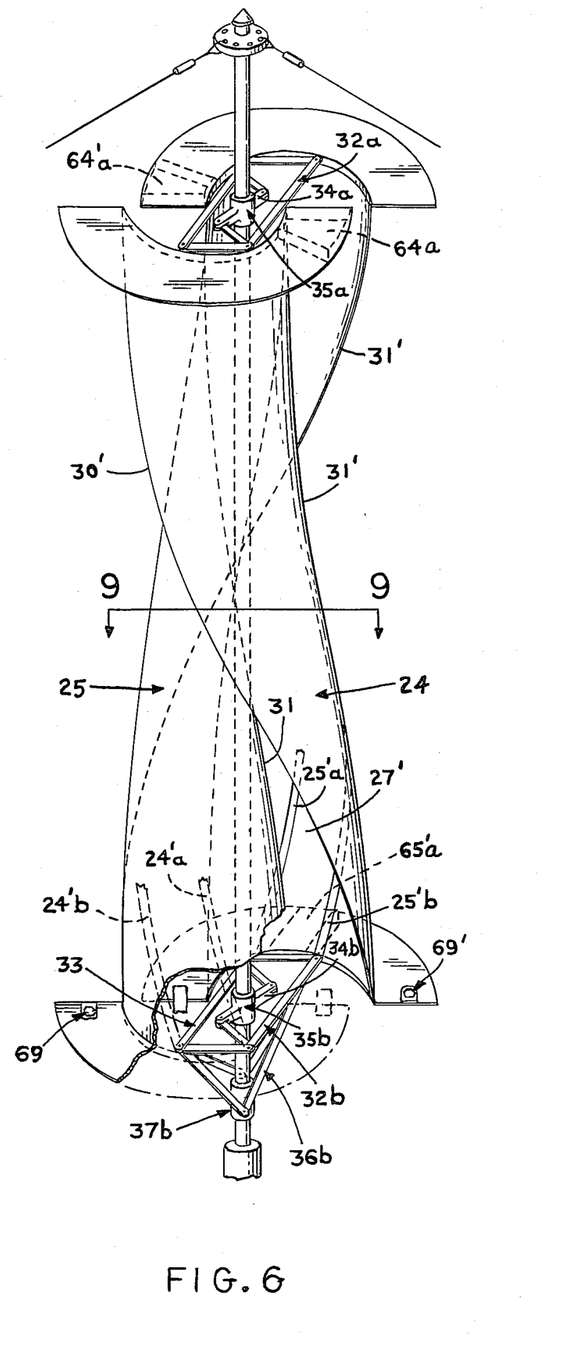
FIG. 6 is an enlarged perspective view of the rotor shown in FIGS. 1 and 5 with the vanes moved sidewise into the full open position for operation of the wind turbine and partly broken away to show the change in the support and transmission assemblies at the upper and lower ends of the rotor.

The vanes are connected to each other and to the main or driven shaft 11 by a plurality of support and transmission assemblies generally designated 32a and 32b, and shown in solid and dotted lines in FIGS. 5 and 6 of the drawings. These support and transmission assemblies are operable to enable the sidewise movement to and fro of the respective vanes 24 and 25 into and out of alignment with each other in directions that are parallel and opposite to each other but generally transverse to the longitudinal or vertical axis of the vertical axis wind turbine 10, so that they rotate about the vertical axis of the wind turbine forming an S-shaped rotor which may have more or less surface exposed to the forces of the winds acting at the time that the vertical axis wind turbine is placed into operation, and these support and transmission assemblies will now be described.

SUPPORT AND TRANSMISSION ASSEMBLY

The support and transmission assemblies 32a and 32b, consist of three interrelated and operatively associated assemblies and while only two are illustrated, it will be clear to those skilled in the art that more than two of such assemblies can be provided without departing from the scope of the present invention.

First is a plurality of vane alignment assemblies as at 33 which connect the vanes 24 and 25 to each other and enable the vanes to move or translate sidewise to and fro from a normally open position to the closed position as a function of a predetermined range of wind velocities.

The exact number and position of these vane alignment assemblies 33 may vary and will depend upon the particular vertical size of the rotor 23 for the given vertical axis wind turbine 10.

When the vanes of the rotor 23 are semi-cylindrical in shape, not shown, and therefore have straight sides, the plurality of vane alignment assemblies not shown, will be disposed in transverse planes normal to the main shaft, will be substantially parallel to each other and will be connected in substantially perfect longitudinal alignment to the opposed inner walls of the respective vanes.

In the illustrated form of the invention where vanes 24 and 25 have the spiral or helical shape of the preferred embodiment as shown in FIGS. 1 to 9 of the drawings, each of the plurality of vane alignment assemblies will not only be disposed in transverse planes normal to the main shaft 11 and substantially parallel to each other but each vane alignment assembly will be connected to the respective inner walls 27 and 27' of the vanes 24 and 25 so that instead of being in longitudinal alignment as in the case of the semi-cylindrical shaped vane, they are offset from each other in the vertical plane so that each vane alignment assembly 33 is offset a predetermined angular circumferential distance from the next adjacent vane alignment assembly. The angle of circumferential displacement is determined relative to the transverse planes normal to the vertical axis of the wind turbine.

In the helical configuration illustrated in FIGS. 1 to 9 of the drawings, the respective plurality of vane alignment assemblies 33 are displaced circumferentially whereby the lowermost of the assemblies is displaced circumferentially substantially 180° from the uppermost of the assemblies and each of the intermediate vane alignment assemblies are displaced an incremental amount between this 180° difference in position between the upper and lower vane alignment assemblies all of which is shown in FIGS. 1 to 9 and will be more fully described below.

Second, is the plurality of pivotal linkage means generally designated 34a and 34b which acts to align and center the vanes 24 and 25 with respect to the main shaft 11. Each pivotal linkage means 34a and 34b, is slidably disposed on the main shaft 11 by means of their respective center hubs 35a and 35b, and to the plurality of an associated one of vane alignment assemblies at the respective opposite ends. It will be understood from the drawings that only an upper pivotal linkage means 34a and a lower pivotal linkage means 34b are illustrated. However, as may be necessary depending on the vertical length of the vertical axis wind turbine 10 at least one or more additional pivotal linkage means can be provided at intermediate points between the upper pivotal linkage means 34a and the lower pivotal linkage means 34b.

And the third assembly of the support and transmission assembly for the rotor 10 is the drive assemblies generally designated 36a and 36b which are fixedly connected to the main shaft 11 at their respective centers by means of the drive hubs 37a and 37b and to the vane alignment assemblies at the respective opposite ends thereof so that when the vanes are deployed in the open position as shown in FIG. 6, the vanes will drive the main or driven shaft 11 through the drive assemblies or transmission couplings 36a and 36b all of which is also shown in FIGS. 1 to 9 of the drawings and will also be described more fully below.

Further however to permit the vanes to operate in accordance with the present invention and to provide means for connecting the support and transmission assemblies, the vanes must be constructed with sufficient resiliency to withstand the distortion which occurs during the translational sidewise movement and rotation of the vanes during the operation of the vertical axis wind turbine.

While the vanes can be constructed for this purpose in a variety of ways, generally in the preferred construction as shown, this will be established by a plurality of longitudinally extending support beams or ribs as at 24'a and 24'b etc. on vane 24 and 25'a and 25'b etc. on vane 25 which in assembled position will be spaced from the vertical axis for the wind turbine but shaped into the desired helical form for the vane as is shown in FIGS. 1 to 9 of the drawings. It will be understood by those skilled in the art that the ribs may also lie parallel to the vertical axis of the wind turbine as where the vanes have a semi-cylindrical shape similar to those shown in the prior art but this is not illustrated.

On the outboard side of the support beams or ribs 24'a and 24'b, 25'a and 25'b etc., any suitable type of resilient material as at 38 on vane 24 and 38' on vane 25 may be affixed such as natural and synthetic resin material or thin gauge metals such as aluminum, stainless steel and the like.

In special forms of the present invention it may also be possible to place tracks, not shown, on the outboard side of the support beams so that flexible materials, also not shown, can be raised or lowered like sails to control the amount of surface exposed to the wind forces acting and this will be understood by those skilled in the art.

Now referring further to FIGS. 5, 7, 8 and 9 of the drawings, it will be seen that in order to connect the support and transmission assembly to the vanes and to the driven main shaft, that each vane has brackets therein in the respective transverse planes of the vane alignment assembly. Thus referring to one of the vane assemblies 33 two transversely aligned and spaced brackets as at 40 and 41 are connected to the ribs 24'a and 24'b of vane 24 and two transversely aligned and spaced brackets 42 and 43 in the same transverse plane as the brackets 40 and 41 are connected to the ribs 25'a and 25'b of vane 25.

The vane alignment assemblies 33 preferably take the form of actual or simulated parallelograms in plan view. In the illustrated form of the invention an actual parallelogram is formed of elements which include a first pair of spaced and parallel connecting members 44 and 45 on one pair of opposite sides of the parallelogram and a second pair of spaced and parallel support members 46 and 47 on the other pair of opposite sides of the parallelogram. It will be understood by those skilled in the art that the support members 46 and 47 are used where the spaced longitudinal beams and the outer skin on each of the vanes 24 and 25 are not strong enough to support the forces that are exerted by the vane assemblies during the operation of the vertical axis wind turbine.

Figures 7, 8, 9, 10, 11, 12, 13:
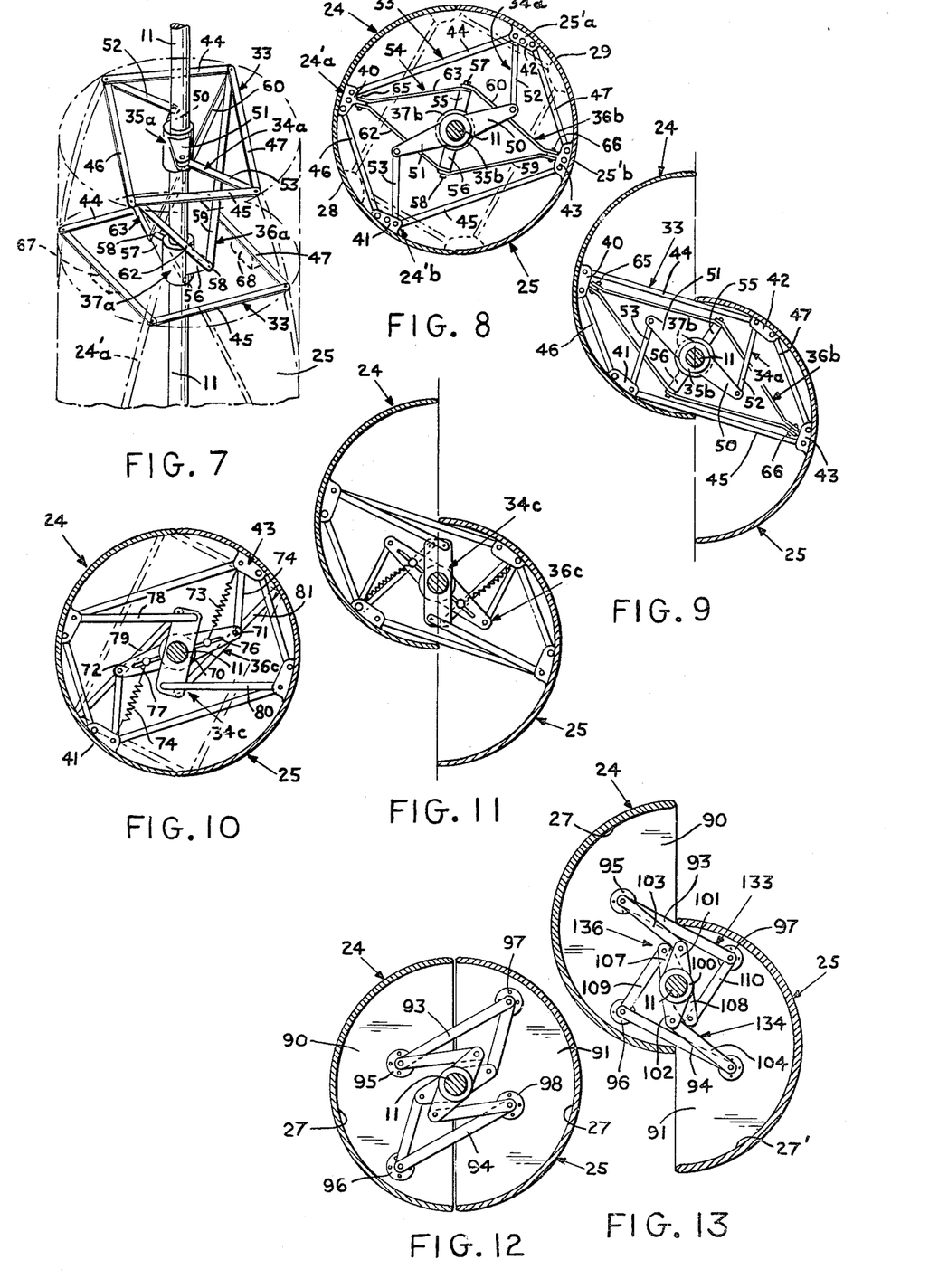
FIG. 7 is an enlarged fragmentary view showing the upper portion of the support and transmission assembly shown in FIGS. 5 and 6 of the drawings.
FIG. 8 is a horizontal cross-section taken on line 8—8 of FIG. 5.
FIG. 9 is a horizontal cross-section taken on line 9—9 of FIG. 6.
FIG. 10 is a cross-section showing an alternate embodiment of the support and transmission assembly for vanes of the rotor on a vertical axis wind turbine in accordance with the present invention in the closed position.
FIG. 11 is a cross-section showing the support and transmission assembly for the alternate embodiment shown in FIG. 10 in the open position.
FIG. 12 is a cross-section illustrating a still further alternate embodiment of a support and transmission assembly for the vanes of the rotor on a vertical axis wind turbine in accordance with the present invention in the closed position.
FIG. 13 is a cross-section showing the support and transmission assembly of the form of the device shown in FIG. 12 deployed to the open position.

Referring further to FIGS. 8 and 9 the connecting member 44 is connected between the brackets 40 on vane 24 and 42 on vane 25 and connecting member 45 is pivotally connected to the brackets 41 on vane 24 and 43 on vane 25 so as to permit the vanes to translate towards and away from each other in assembled position.

In establishing the parallelogram defined by the respective connecting members 44 and 45 which articulate and change their angular relation to the associated support members 46 and 47, the parallelograms are established with angular relationships such that the vanes 24 and 25 will be in the fully opened or deployed position. This arrangement places the vanes 24 and 25 in at least an initial position to commence operation in accordance with the wind forces acting and permits the vanes to decrease and then adjust the surface area in accordance with such wind forces within the predetermined range of wind forces within which the particular wind turbine can operate.

In order to connect the pivotal linkage assemblies 34a and 34b to an associated one of the vane alignment assemblies, the central hubs 35a and 35b have laterally or horizontally extending arms as at 50 and 51 which extend in opposite directions and at the respective remote ends thereof are pivotally connected to one respective end of first linkage rod 52 and second linkage rod 53, each, in turn, respectively connected at their opposite ends to a pair of associated cross brackets as at 41 on vanes 24 and 42 on vane 25 so that as the vanes 24 and 25 translate or move sidewise to and fro relative the vertical axis of the main shaft 11, the pivotal assemblies 34a and 34b act to center the vanes relative the driven main shaft 11.

Drive assemblies 36a and 36b are also connected to the vanes 24 and 25 by suitable articulated members which are adapted to both move relative the central hubs 37a and 37b of the drive assemblies 36a and 36b which are fixedly connected to the driven main shaft 11 at one end while their opposite end moves with the respective vanes 24 and 25. Thus by reference to FIGS. 5, 6, 7 and 8, each of the central hubs 37a and 37b have pairs of diametrically disposed oppositely extending arms as at 55 and 56 pivotally connected at their ends remote from the fixed central hubs 37a and 37b as at 57 and 58 to the respective legs or drive connections 59 and 60 on a first wishbone member and 62 and 63 on a second wishbone member which wishbone members at their apex ends remote from the central hubs 37a and 37b are pivotally articulated and connected as at 65 to bracket 40 on vane 24 and at 66 to bracket 43 on vane 25 by any suitable type of universal connection, not shown, which permits the wishbones to pivot and move arcuately in the plane containing the longitudinal axis of the shaft 11 relative the central hubs 37a and 37b as the vanes 24 and 25 translate or move sidewise to and fro relative the vertical axis of the shaft without interfering with the drive transmission function of the drive assembly for transmitting the rotary motion of the vanes 24 and 25 to the driven main shaft 11.

The drive assemblies 36a and 36b not only transmit the torque developed by the rotating vanes 24 and 25 to the driven main shaft 11 but in addition also act to support and center the vanes 24 and 25 relative shaft 11.

However by reason of the weight exerted by the vanes 24 and 25, and the support and driving assemblies, the vanes in assembled position will tend to move to a normally open position.

This factor however provides a relatively simple means for controlling and maintaining the rate of rotation of the vertical axis wind turbine in that if the distribution of the weight or mass of each of the vane alignment assemblies is so adjusted or if the weight acting on other portions of the vanes 24 and 25 is so adjusted that the center of gravity for each of the vanes moves further away from the mutual axis of rotation of the shaft 11 and the vertical axis wind turbine 10 as the vanes move towards each other then centrifugal forces acting will tend to overcome the vertical effect of the weight of the vanes at high rotational speeds and shift the vanes 24 and 25 so they translate from the open to the closed position.

The rotation control means operates by controlling the translation of the vanes with respect to each other. Maximum speed of rotation, under load, will be developed when the vanes are fully extended, as illustrated in FIGS. 6 and 9. During such extension, excessive wind velocity can prove counter productive by causing excessive torque, speed, and drag forces to build up. The vane movement to closed position prevents the rotor from becoming damaged.

Alternate or additional means for controlling the rate of rotation can be provided by weight means located on the vanes or the vane assemblies which operates in response to centrifugal force developed during rotation to urge the vanes toward each other. The weight means may be either permanently or removably attached to the vanes or vane assemblies.

Thus referring to FIG. 7, weights shown in phantomized form as at 67 on connecting arm 46 and 68 on connecting arm 47 show one means for adding weights to the vane alignment assemblies so as to provide this desirable regulating mechanism for the vertical axis wind turbine.

Further however semi-discs 28a and 29a on the respective upper and lower ends of the vanes 24 and 28'a and 29'a on the respective upper and lower ends of the vanes 25 are provided to improve the areodynamic performance of the vertical axis wind turbine and also provide respectively additional long radially extending surfaces to which counterweights shown in phantomized form as at 64a and 65a on semi-discs 28a and 29a and 64'a and 65'a on semi-discs 28'a and 29'a can be attached to minimize the weights required on the vane aligning assembly for adjusting the center of gravity for the vanes 24 and 25 so as to accomplish this desirable regulatory mechanism to control the rate of rotation of the vertical axis wind turbine.

Additional semi-discs not shown, can be added intermediate the upper and lower ends of the vanes 24 and 25 as may be required for better aerodynamic flow conditions or better regulation of the rate of rotation of the vertical axis wind turbine.

OPERATION

In operation, a vertical axis wind turbine constructed as above described when not in operation will be maintained in the secured or closed position as shown in FIG. 1 of the drawings by any suitable means such as a latching controls 69 and 69' as shown in FIGS. 5 and 6 of the drawings.

When the latches are open, the weight of the vanes will cause the vanes 24 and 25 to normally separate and move to an open position, this being controlled by the degree to which the vane aligning assemblies will permit the vanes 24 and 25 to move into such position.

As the wind moves past the open vanes 24 and 25, the exposed surfaces thereof will respond to the forces exerted by the winds which are then acting and will cause the vanes 24 and 25 to operate in a counterclockwise direction as seen from above.

The vanes will transmit this rotary motion through the support and transmission assemblies 32a and 32b to the main shaft 11 causing the same to rotate and in turn drive the connecting gears 18, shaft 19, coupling 20 and the generator shaft 21 of the generating mechanism 22 to generate electrical energy for any desired use.

Whenever the rate of rotation of the vanes 24 and 25 reaches a predetermined maximum speed by reason of the action of centrifugal forces the vanes 24 and 25, will move sidewise so as to move towards each other and into the right circular cylinder or closed position until the forces of the wind causing such high rotation abate at which time the weight of the vanes will cause the vanes to again automatically move to the open or partially open position as a function of the wind velocity thus permitting the vertical axis wind turbine to operate safely and without a complicated control mechanisms.

SPRING BIASED SUPPORT AND TRANSMISSION ASSEMBLY

FIGS. 10 and 11 show an alternate embodiment of the present invention in which tension exerted on the supporting and transmission assembly for the vanes 24 and 25 will cause the vanes to translate or move towards the open configuration as shown in FIG. 11. This is accomplished by resilient means on the drive assemblies or transmission couplings generally designated 36c. In this form of the invention the vanes do not move vertically with respect to shaft 11 as they translate horizontally to and fro.

Thus the transverse or drive assembly 36c in this embodiment comprises a central collar 70 which is fixedly connected for driving engagement of the main shaft 11 and is modified by the attachment to the oppositely extending arms 71 and 72 thereon of coil springs as at 73 and 74. Coil Springs 73 and 74 are connected at one end to the arms 71 and 72 and at their opposite ends to the cross brackets 41 and 43 as is shown in FIGS. 10 and 11 of the drawings.

The lateral extending arms 71 and 72 are provided with slots as at 76 and 77 which permit adjustment of the tension of the springs 73 and 74 to adjust the sidewise movement of the vanes 24 and 25 in response to this spring tension. In addition, the pivotal linkage assembly 34c is modified by providing struts respectively as at 78 and 79 for vane 24 and drive struts 80 and 81 for vane 25.

The interaction of the resilient means above described with the tension of the struts 78, 79, 80 and 81 can be further adjusted by the addition of appropriate size counterweights as above described so that this form of the invention will achieve the automatic speed torque and drag force limitations as was described above for the gravity operated form of the present invention.

In operation this form of the invention is otherwise identical with the form of the invention as above described for FIGS. 1 to 9 of the drawings.

ALTERNATE MECHANICAL SUPPORT FOR VANE ALIGNMENT ASSEMBLIES AND PIVOTAL LINKAGE ASSEMBLIES

FIGS. 12 and 13 illustrate a further mechanical means for connecting the vane alignment assemblies to the vanes of the rotor for the vertical axis wind turbine in accordance with the present invention. Since the vanes in this form of the invention do not move vertically relative the shaft 11 they can also be spring biased as shown in FIGS. 10 and 11.

Thus vanes 24 and 25 are shown as having respective flat semi-cylindrical support or connecting plates as at 90 and 91 which are connected to the inner walls 27 and 27' of the respective vanes 24 and 25 by any suitable means.

The vane alignment assemblies generally designated 133, only one of which is illustrated, have their main articulated support arms 93 and 94 connected respectively at one end to brackets 95 and 96 on vane 24 and at their opposite ends to brackets 97 and 98 on vane 25.

The pivotal linkage assembly 134 only one of which is illustrated has a central hub 100 slidably mounted about the shaft 11 has lateral extensions as at 101 and 102. Articulated lever arms as at 103 and 104 are connected at one end to the ends of one of the lateral extensions 101 or 102 and at their opposite ends respectively to the brackets 95 and 98. The pivotal linkage assembly 134 functions to center the vanes in the same manner as the pivotal linkage assemblies 34a and 34b of the form of the invention shown in FIGS. 1 to 9 of the drawings.

The drive or transmission assembly generally designated 136 also has a central drive hub not shown which is fixedly connected to shaft 11 and has lateral drive members as at 107 and 108. The motion of the vanes 24 and 25 is transmitted through drive arms 109 and 110 which are connected at one end to the brackets 96 and 97, and at the opposite ends to the lateral drive members 107 and 108. The drive or transmission assembly 136 will in this position not only transmit the wind forces but will also coact with the pivotal linkage assembly 134 to center the vanes 24 and 25 relative the vertical axis of the shaft 11.

In operation, this form of the invention is also otherwise identical with the forms of the invention as above described for FIGS. 1 to 9 of the drawings.

Thus various forms of vertical axis wind turbines have been above described in which the construction of the vanes and the support and transmission assemblies therefore provides a rotor for such vertical axis wind turbine which operates with improved uniformity and regularity so as to make it particularly well suited for applications requiring constant uniform rotational output such as in the generating of electrical energy as illustrated schematically in FIG. 1 or in the pumping of fluids.

It will be understood that the invention is not to be limited to the embodiments described and shown herein as these are deemed merely illustrative of the best modes of carrying out the present invention. Such modes are adaptable for modification in form, size, arrangement of parts, and details of operation as will be understood by those skilled in the art. The invention rather is intended to encompass all such modifications which are within the spirit and scope of the claims as hereinafter set forth.

What is claimed is:

1. A vertical axis wind turbine for generating usable energy comprising:
   a. driven shaft means,
   b. cylindrical rotor means symmetrically disposed about said driven shaft including paired complementary vanes mounted on said driven shaft and disposed in the closed position to define a right circular cylinder,
   c. support and transmission assembly means connecting said vanes and said driven shaft for self varying, essentially linear sidewise movement of said vanes with respect to each other relative the vertical axis of said driven shaft to vary the surface available for contact by the wind,
   d. said vanes normally disposed in the open position, and
   e. means for controlling the rate of rotation of said vertical axis wind turbine by moving the said vanes to the closed position in a predetermined range of wind velocities,
   f. wherein each of said vanes is longitudinally extended and spiraled in the longitudinal direction through an arc of up to 180° from one end of said vane to the other, and said vanes are adapted to undergo axial distortion during said sidewise movement.

2. In a vertical axis wind turbine as claimed in claim 1 wherein said support and transmission assembly means includes,
   a. at least one vane alignment assembly,
   b. said vane alignment assembly including, paired connecting members pivotally connected at their respective opposite ends to each of said complementary vanes in a plane generally transverse to the longitudinal axis of said vertical axis wind turbine and substantially parallel to each other, and
   c. bracket means on the inner surface of each of said complementary vanes for pivotally connecting said support and transmission assembly means thereto.

3. In a vertical axis wind turbine as claimed in claim 1 wherein,
   a. said vanes include, a plurality of support ribs connected to the inner surface thereof and extending the entire length of said vanes,
   b. a plurality of brackets connected to said support ribs, and
   c. said support and transmission assembly means including a plurality of vane alignment assemblies pivotally connected to said bracket means in a plane generally transverse to the longitudinal axis of said vanes.

4. In a vertical axis wind turbine as claimed in claim 1 wherein said support and transmission assembly means comprises,
   a. at least one vane alignment assembly,
   b. at least one associated and pivotally connected linkage assembly for centering said vanes relative the driven shaft, and
   c. at least one driven assembly having articulated connecting members fixedly connected to said driven shaft at one end and pivotally and movably connected to said vane alignment assembly at the end remote therefrom.

5. In a vertical axis wind turbine as claimed in claim 4 wherein said vane alignment assembly includes,
   a. paired connecting members pivotally connected at opposite ends to each of said vanes in a plane generally transverse to the longitudinal axis of said vanes and substantially parallel to each other,
   b. paired support members fixedly mounted between said paired connecting members, and
   c. said connecting members and said support members cooperate to define a parallelogram configuration adapted to change in angulation in response to the sidewise movements of the complementary vanes of said rotor.

6. In a vertical axis wind turbine as claimed in claim 4 wherein said vane alignment assembly includes, a pivotal linkage assembly slidably mounted on said driven shaft and pivotally connected to said vane alignment assembly, said pivotal linkage assembly including, a central collar mounted about said driven shaft, paired arms projecting diametrically from said collar, and at least one strut pivotally connected between the ends of said paired arms remote from said collar and to each of said complementary vanes.

7. In a vertical axis wind turbine as claimed in claim 6 wherein said drive means comprises,
   a. a central collar fixedly mounted on said driven shaft,
   b. paired arms projecting diametrically from said collar,
   c. paired wishbone members having leg means pivotally connected to the remote ends of said paired arms and the apex ends of said wishbone members connecting for pivotal and angular movement to said vane alignment assemblies.

8. In a vertical axis wind turbine as claimed in claim 1 wherein said means for controlling the rotation thereof comprises,
   a. weight means in said vanes so that the center of gravity of said vanes is most nearly adjacent the longitudinal axis of said vertical axis wind turbine when the vanes are in the fully open position.

9. In a vertical axis wind turbine as claimed in claim 8 wherein said weight means is detachably and adjustably connected to said support and transmission assemblies.

10. In a vertical axis wind turbine as claimed in claim 1 wherein said means for controlling the rotation comprises weights connected to said vanes so that the centers of gravity thereof are most nearly adjacent said longitudinal axis of the vertical axis wind turbine when said vanes are disposed in said fully open position.

11. A rotor for use in a vertical axis wind turbine which comprises,
   a. paired complementary vanes adapted in the closed position to define a right circular cylinder,
   b. support and transmission assembly means for connecting said vanes in said vertical axis wind turbine,
   c. said support and transmission assembly comprising, a vane alignment assembly, a pivotal linkage assembly, and a driven assembly, and,
   d. means attached to said vanes for controlling the position of the center of gravity for said vanes in the assembled position on said vertical axis wind turbine so that the centrifugal forces during operation automatically control the rate of rotation of said vertical axis wind turbine by acting to move the vanes to the closed position within a predetermined range of wind velocities, e. Wherein each of said vanes is longitudinally extended and spiralled in the longitudinal direction through an arc of up to 180° from one end of said vane to the other, and said vanes undergo essentially linear, self-varying sidewise movement with respect to each other and with respect to the vertical axis of the turbine, and are adapted to undergo axial distortion during said sidewise movement.

* * * * *